UNITED STATES PATENT OFFICE.

LOUIE OSBORNE FERSON, OF CHICAGO, ILLINOIS.

CONDENSED RATION AND METHOD OF MAKING SAME.

SPECIFICATION forming part of Letters Patent No. 665,416, dated January 8, 1901.

Application filed September 13, 1900. Serial No. 29,932. (No specimens.)

*To all whom it may concern:*

Be it known that I, LOUIE OSBORNE FERSON, a citizen of the United States, residing in Chicago, in the county of Cook and State of Illinois, have invented a new and useful Improvement in Food Products and Processes of Preparing the Same, of which the following is a specification.

My object in this invention is to provide a superior and palatable article of food in condensed form and specially adapted to be used by soldiers in the field, by seamen, by travelers, and by others in cases where it is desirable that the food should be reduced both in bulk and weight to a minimum to render it easy to carry or transport.

The invention consists in the improved article produced by the process hereinafter set forth—to wit, pork and beans combined, compressed, and baked, and the method of preparing the same.

In the preparation of my improved article of food I proceed substantially as follows: After thoroughly washing the beans and removing all foreign substances mixed with them I soak them for twelve hours in cold water, and at the conclusion of the soaking rinse them again. Then I put them into a kettle with the pork, first scoring the rind of the pork. If the beans measure one quart, the pork should weigh about one pound, and six quarts of cold water should be put in the kettle with them. The kettle is then heated slowly for half an hour, after which the contents are poured into a colander and strained, after which I put them in an earthen pot, placing the pork in the center of the mass. I now mix salt one table-spoonful, molasses one table-spoonful, soda one teaspoonful, and mustard one teaspoonful, with one quart of boiling water and pour the mixture into the pot with the beans and pork. If the beans are not completely covered, add more water. The pot is now covered and the contents cooked slowly for ten hours, adding hot water from time to time as required. I next pour the contents of the pot into a shallow pan and subject them to moderate heat until quite dry, and then crush or beat them to a smooth paste and add for each quart of paste four ounces of wheat-flour and four ounces of water, mixing them thoroughly, so as to carry the flour through the mass. Other kinds of flour may be substituted for the wheat, if desired; but I prefer to use the wheat-flour. The paste, with its admixture of flour, is then rolled out and subjected to severe pressure, sufficient to reduce the bulk of the mass, say, four-fifths or five-sixths, thereby thoroughly incorporating the fat of the pork with the beans. The compressed material is then cut into smooth squares, cubes, or other shape desired, placed in shallow pans, brushed lightly with melted butter or lard in order to glaze the top surface, and baked in a moderately-heated oven until a rich brown color is obtained. The product is then ready for consumption, and may be eaten as biscuit or dissolved in a small quantity of hot water and converted into purée or soup, the proportion of water being regulated by the consistency desired.

The advantages attending my invention are manifold. The product contains in correct proportions all necessary food elements—such as proteids, carbohydrates, fats, salts, and extractives—and presents them in simple form, with minimum of waste, and the process of preparation reduces them to a condition in which they are highly digestible and capable of prompt assimilation. As is well known, the beans contain a large proportion of nitrogenous, as well as starchy, material, and the addition of the pork and seasoning supplies the other essential nutritive elements. The repeated soaking and slow process of cooking employed by me dissolves the tough envelop of the bean and liberates the nitrogenous and starchy materials, and the pulverizing reduces them to a condition which admits of ready absorption. The addition of the pork raises the percentage of fat and increases the digestibility. The swelling starch granules released by the cooking mingle with and absorb the melted fat during the cooking, and the fat tissues are forcibly incorporated with the starchy parts by the pressure. The product not only thus contains a large amount of available nutriment, but is so condensed that it is easily carried by the tourist, miner, or soldier and is well adapted for use as an army ration. It will keep for a long time without being protected from the air; but if inclosed in hermetically-sealed packages it may be kept an indefinite period in any climate. It provides the consumer within itself all the elements of a complete meal— viz., soup, vegetable, and meat.

It will be understood that I do not wish to be limited to every detail of the process set forth, but that the essential steps of the process are those set forth in the claims. It will also be understood that I do not wish to be limited to the periods specified for the various operations set forth, nor to the use of the particular seasoning materials specified, nor to the glazing of the cakes.

I claim—

1. The process of preparing compressed and baked pork and beans consisting in soaking the beans in cold water, boiling the beans with the pork and seasoning, then drying them, then beating or crushing them to a paste, then adding flour and water, then severely compressing the combined materials, then reducing them to form in cakes, and then baking, substantially as described.

2. The process of preparing compressed baked and seasoned pork and beans, consisting in reducing the boiled beans and pork to a paste, then mixing flour in the paste, then compressing the mixture, and then baking, substantially as specified.

3. The improved condensed ration consisting of a compressed, coherent, baked cake or biscuit, composed of a homogeneous mixture of cooked pork and beans with flour, as set forth.

LOUIE OSBORNE FERSON.

Witnesses:
H. M. MUNDAY,
L. E. CURTIS.